US009705675B2

(12) United States Patent
Painchault et al.

(10) Patent No.: US 9,705,675 B2
(45) Date of Patent: Jul. 11, 2017

(54) METHOD AND SYSTEM MAKING IT POSSIBLE TO TEST A CRYPTOGRAPHIC INTEGRITY OF AN ERROR TOLERANT DATA ITEM

(75) Inventors: Philippe Painchault, Gennevilliers (FR); Eric Garrido, Gennevilliers (FR); Sandra Marcello, Gennevilliers (FR)

(73) Assignee: Thales, Courbevoie (FR)

( * ) Notice: Subject to any disclaimer, the term of this patent is extended or adjusted under 35 U.S.C. 154(b) by 117 days.

(21) Appl. No.: 13/977,554

(22) PCT Filed: Dec. 22, 2011

(86) PCT No.: PCT/EP2011/073873
§ 371 (c)(1),
(2), (4) Date: Oct. 29, 2013

(87) PCT Pub. No.: WO2012/089632
PCT Pub. Date: Jul. 5, 2012

(65) Prior Publication Data
US 2014/0052987 A1 Feb. 20, 2014

(30) Foreign Application Priority Data
Dec. 30, 2010 (FR) .................................. 10 05185

(51) Int. Cl.
*H04L 9/32* (2006.01)
*H04L 9/06* (2006.01)

(52) U.S. Cl.
CPC .................. *H04L 9/32* (2013.01); *H04L 9/06* (2013.01); *H04L 9/3242* (2013.01); *H04L 2209/26* (2013.01); *H04L 2209/34* (2013.01)

(58) Field of Classification Search
CPC ....................... H04L 9/32–9/3297; H04L 9/06
USPC .......................................................... 713/168
See application file for complete search history.

(56) References Cited

U.S. PATENT DOCUMENTS

| 8,132,073 B1* | 3/2012 | Bowers ............. H03M 13/3761 713/160 |
| 2004/0193880 A1* | 9/2004 | Walmsley ............ B41J 2/04505 713/168 |
| 2011/0162081 A1* | 6/2011 | Lopez ................... H04L 9/3242 726/26 |
| 2012/0096274 A1* | 4/2012 | Campagna ............ H04L 9/3066 713/176 |

OTHER PUBLICATIONS

Yu Liu, "Research on Extended Noise Tolerant Message Authentication codes and Applications on Noisy Information Authentication", Dissertation University of Delaware, Apr. 21, 2007, pp. 1-147.

(Continued)

*Primary Examiner* — Yin-Chen Shaw
*Assistant Examiner* — Carlos Amorin
(74) *Attorney, Agent, or Firm* — Baker Hostetler LLP

(57) ABSTRACT

A method and system for testing the cryptographic integrity of data m comprises at least the following elements: a module transmitting a message M, said module comprising a memory for storing the parameters used to execute the steps of the method, such as the key, the public data, a transmission medium, a receiver module also comprising storage means for storing at least the same parameters as in transmission. The system may comprise storage means for storing confidential data such as the secret keys, a processor suitable for executing the steps.

5 Claims, 3 Drawing Sheets

(56) References Cited

OTHER PUBLICATIONS

Osnat Karent et al., "More on the Distance Distribution of BCH Codes", I EEE Transaction on Information Theory, I EEE Press, USA, vol. 45, No. 1, Jan. 1, 1999, XP011027249, ISSN: 0018-9448, pp. 251-256.
Jaydeb Bhaumik et al., "An Integrated ECC-MAC Based on RS Code", Jan. 1, 2009, Transactions on Computational Science IV, Springer Berlin Heidelberg, Berlin, Heidelberg, pp. 117-135, XP019116452, ISBN: 978-3-642-01003-3.

* cited by examiner

METHOD AND SYSTEM MAKING IT POSSIBLE TO TEST A CRYPTOGRAPHIC INTEGRITY OF AN ERROR TOLERANT DATA ITEM

CROSS-REFERENCE TO RELATED APPLICATIONS

This application is a National Stage of International patent application PCT/EP2011/073873, filed on Dec. 22, 2011, which claims priority to foreign French patent application No. FR 1005185, filed on Dec. 30, 2010, the disclosures of which are incorporated by reference in their entirety.

FIELD OF THE INVENTION

The object of the present invention relates to a method and a system that make it possible to test an integrity of error-tolerant data.

It is notably applicable to the field of telecommunications for testing the integrity of the messages, in the radio domain, in the domain of cryptography more generally for testing the integrity of data.

BACKGROUND

The information that passes through radio channels is more often received with errors.

From the telecommunications point of view, this problem is resolved with the application of a correcting code which makes it possible to correct the errors.

What the correcting code will consider to be errors may result:
from physical transmission errors,
from modifications made intentionally by a hacker in order to spoof the receiver.

The conventional maximum security solution consists in forging an imprint of the message transmitted and in transmitting this imprint together with the message. On reception, an imprint of the received message is computed by the receiver and compared with the received imprint. If a single bit of these two imprints differs then the message is rejected because it is potentially modified by a hacker. In practice, the error-correction telecom layer has already been applied and has corrected the transmission errors.

This security solution may for some applications be maximalist. This is because some applications may not be corrupted significantly by a (fixed) minimum number of modified bits and this may not have any impact on the security of the system.

The problem is therefore how to guarantee the security while, if appropriate, allowing certain applications to be able to be corrupted by errors.

Thus, depending on the applications, the security policy of the system will be strict and will not tolerate any error or, on the other hand, will allow a predefined number of errors.

One approach known from the prior art consists in dividing the message authentication codes (MACs) into a plurality of blocks, but this does not solve the problem. This method makes it possible to reject messages of smaller size and, in addition, the size of the MACs being smaller, the probability of errors is lower.

The article by Ch. G. Boncelet, entitled "The NTMAC for authentication of noisy messages" IEEE Transactions on Information Forensics and Security Vol. 1 No. 1, March 2006 is an illustration of this type of approach.

Despite all the advantages offered by implementing the systems of the prior art, the latter do however present the following drawbacks:
the prior solutions do not allow for the correction of the transmitted errors,
the error correction layer is applied upstream for "TELE-COM" purposes,
the prior solutions try to approach a solution by reducing the size of the MACs, without however solving the problem posed.

SUMMARY OF THE INVENTION

One of the objectives of the present patent application is to define a function of message authentication code (MAC) type that can tolerate errors in the transmission (or the conservation) of the messages. More specifically, the checking procedure does not supply an OK/NOK decision but supplies a score which indicates the proximity of the data received with the valid message, while retaining the security provided by the cryptographic protection function.

The invention relates to a method for testing the cryptographic integrity of data m, characterized in that it comprises, in combination, at least the following steps:
a first step during which a key (C, Ksym) is generated by executing the following steps:
let F(GF(p), n, M, d) be a family of linear or nonlinear system error-correcting codes over GF(p) of length n, of cardinal M and distance d,
randomly draw a correcting code C from the family F(GF(p), n,k,d) that has a correction capacity t, and define the key Ksym,
a second step comprising the following steps:
code (20) said data m by using the correcting code selected in the first step,
for a systematic code, compute the redundancy r, and use the secret key Sk(C, Ksym, I) with I being a non-zero integer less than t which represents the number of errors accepted in order to protect (21) the redundancy r, the result obtained is the protected redundancy $rp = SYM_{ksym}(r)$, with $SYM_{ksym} = SYM$ being a symmetrical encryption block algorithm and Ksym being a secret key, transmit (22) the data (m|rp) resulting from the second step, the message with the encrypted redundancy,
a third step comprising the following steps:
for a systematic code, let (ma|ra) be the input data for this function, reverse the redundancy confidentiality protection mechanism using the inverse of the symmetrical encryption algorithm and of the secret key $SYM_{ksym}^{-1}(ra)$, (30), ra being the encrypted redundancy received in the integrity checking step,
let $D_1$ be a decoding function associated with the chosen code C which has as input any datum and which has as output the word of the code that is closest in terms of distance, and a decoding successful OK or decoding unsuccessful information item,
$D_1$ is applied to the whole made up of the received message ma concatenated with the inverse of the redundancy $SYM_{ksym}^{-1}(ra) \; D_1(ma|SYM_{ksym}^{-1}(ra))$,
if the decoding is not possible, there is no word of the code at a sufficiently small distance, (32), the data are considered to be non-integral,
otherwise, if the decoding is possible:
if $d(h_{n-k}(D_1(ma|SYM_{ksym}^{-1}(ra)), ma) < I+1$, then the response is OK with, as effective useful message received, $h_{n-k}(D_1(ma|SYM_{ksym}{}^{-1}(ra)))$ and the information on the distance $d(h_{n-k}(D_1(ma|SYM_{ksym}{}^{-1}(ra)), ma)$, otherwise, the data are considered to be non-integral, $d()$ is the distance in terms of the number of elements of GF(p) that are different, and $h_{n-k}$ is the function which takes a character string as input and associates with it the n−k first characters of the string.

In the case of a systematic code, the method comprises, for example, a step of encryption of the data encrypting all of the useful message and of the redundancy r in transmission in transmission and a step of decryption of said data in reception.

The processed data may be messages used in transmission systems.

According to a variant embodiment, the redundancy r is protected in confidentiality by virtue of a block encryption or an xor with a pseudo-random generator.

The invention also relates to a system for testing the cryptographic integrity of data m comprising at least the following elements: a module transmitting a message M, said module comprising a memory for storing the parameters used to execute the steps of the method according to the invention, such as the key, the public data, a transmission medium, a receiver module also comprising means for storing at least the same parameters as in transmission. The system may comprise means for storing confidential data such as the secret keys, a processor suitable for executing the steps of the method according to the invention.

BRIEF DESCRIPTION OF THE DRAWINGS

Other features and advantages of the present invention will become more apparent on reading the following description given as a nonlimiting illustration, with the appended figures which represent.

DETAILED DESCRIPTION

In order to better understand the principle implemented in the method according to the invention, the following description is given in a context of transmission-reception of a message in a telecommunications system. The method according to the invention is valid for a linear or nonlinear systematic code.

Figure 1:
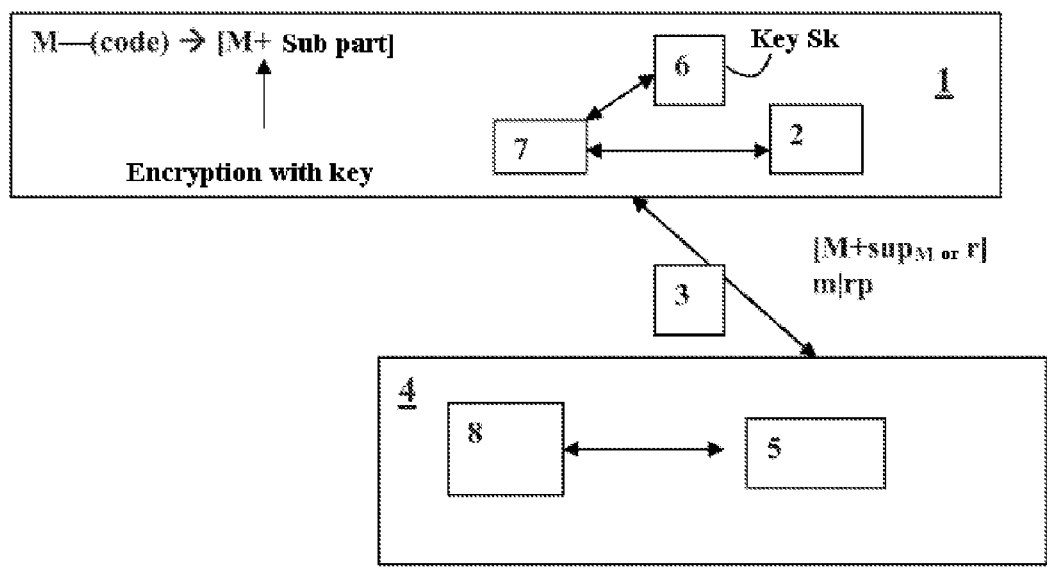
FIG. 1, an exemplary system for implementing the method according to the invention in the field of telecommunications, FIG. 2, an exemplary configuration of the equipment, FIG. 3, an example of steps implemented in transmitting a message, FIG. 4, an example of steps of the method according to the invention implemented on receiving a frame.

FIG. 1 schematically represents an exemplary architecture of a system comprising a module 1 transmitting a message M, said module comprising a memory 2 for storing the parameters used to execute the steps of the method according to the invention, such as the key, the public data, which will be explained hereinbelow, a transmission medium 3, a receiver module 4 also comprising means 5 for storing at least the same parameters as in transmission and a processor 7, 8 suitable for executing the steps implemented by the method according to the invention. The system may comprise means 6 for storing confidential data such as the secret keys.

The solution implemented by the method consists, notably, in using in a non-standard manner error-correcting codes or, more specifically, a family of error-correcting codes.

The code used at an instant, out of the family of codes, is considered to be a part of the secret key. Let us consider first of all the case of systematic codes, which notably encompasses linear codes. The result of the coding is therefore the concatenation of the message and of a redundancy. The redundancy r is then protected in confidentiality by virtue of a block encryption or an xor with a pseudo-random generator.

Secondly, let us consider the case of any codes, and in this case, the whole of the coding result is protected in confidentiality.

Figure 2:
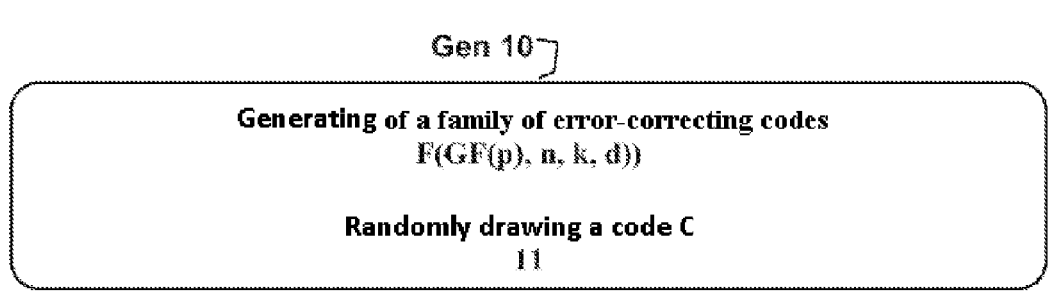
Figure 3:
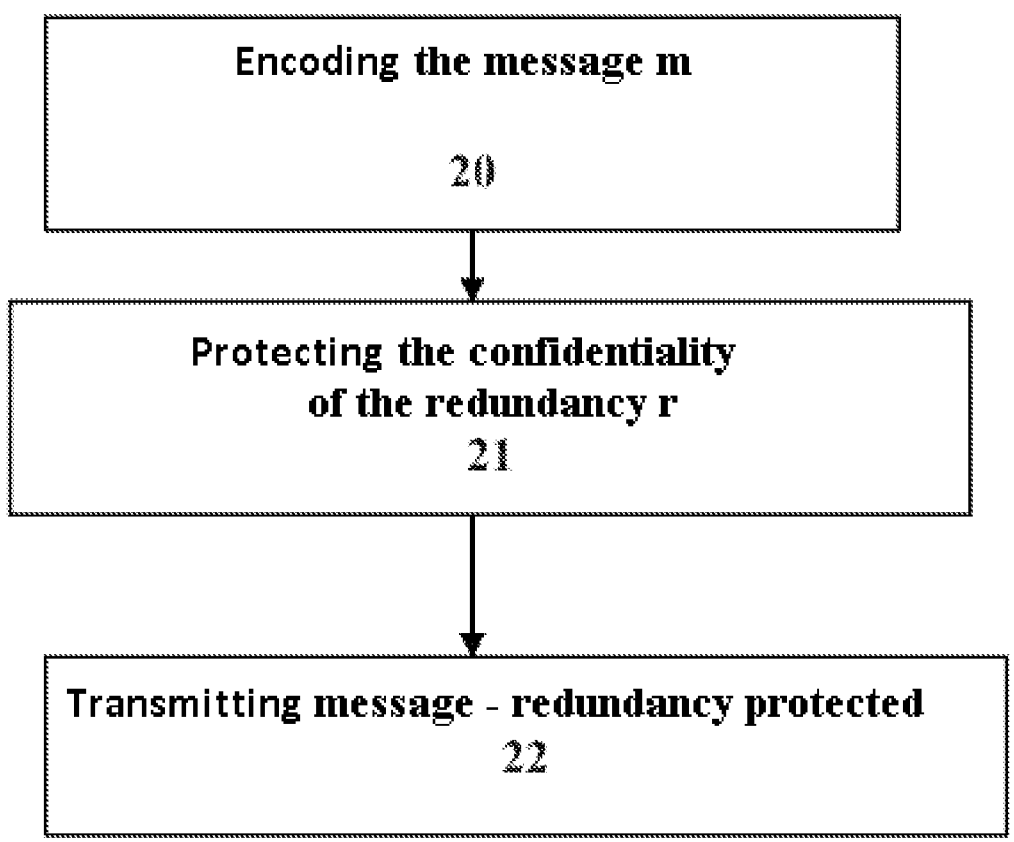
Figure 4:
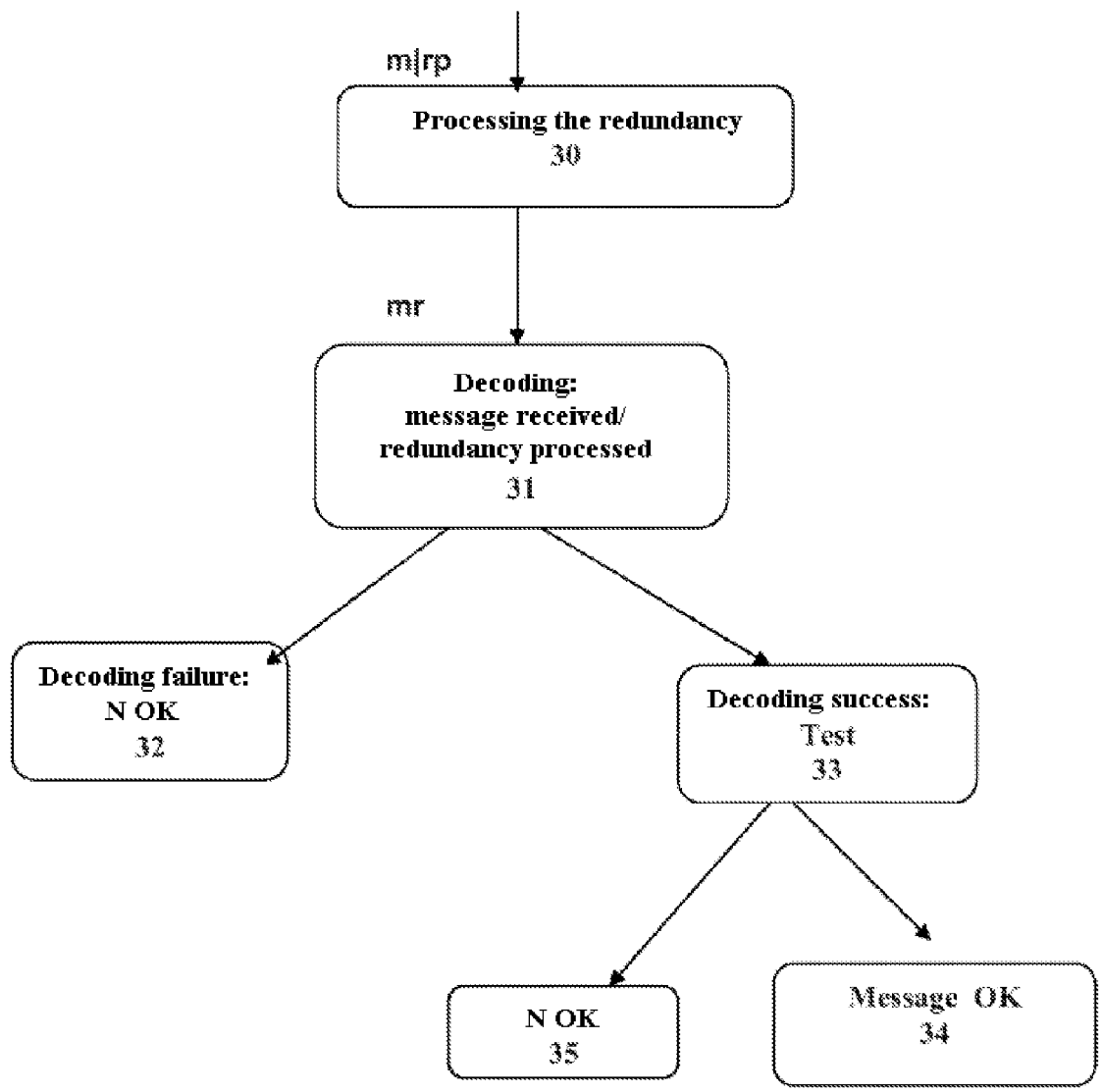

The description which follows is given in relation to FIGS. 2, 3 and 4.

Notations

Let p be a prime number, GF(p) the body with p elements.

Let n, k, d be non-zero natural integers, C(GF(p),n,k,d) an error-correcting code over GF(p) of length n, dimension k and distance d. Let Fam(GF(p),n,k,d) be a family of error-correcting codes over GF(p) of length n, dimension k and distance d.

We use x|y to denote the concatenation of the character string x with the string y. The symbol | expresses the concatenation operation. These parameters relate to the datum whose integrity is to be tested, or the message whose integrity will be tested by the method according to the invention.

DEFINITION

Take a message m of length n−k; the method according to the invention will implement at least the following 3 steps, this scheme making it possible to construct a message authentication code with error correction, or, more precisely Message Authentication Code with Error Correcting Code (MACECC).

First Step Explained with FIG. 2

The first step Gen 10, FIG. 2, consists in generating a key (C, Ksym) which will be used to encrypt the supplementary or redundancy part r produced by application of the chosen correcting code, the supplementary part, or supM, being used to correct the errors.

Let F(GF(p),n,k,d) be a family of error-correcting codes over GF(p) of length n, dimension k and distance d (a component of the space of the keys).

The method executes a random drawing 11 of an error-correcting code C from the family F(GF(p),n,k,d) that has a correction capacity t, the random drawer being performed according to a method known to a person skilled in the art.

Let I be a non-zero integer less than t; I represents the number of errors accepted for the useful part or supplementary part or, more generally, for all of the message. The next step is to define the symmetrical key Ksym.

A symmetrical block algorithm SYM and its secret key Ksym are used to encrypt the supplementary part to encrypt the redundancy or even to encrypt all of the data or of the message.

The public parameters are (F(GF(p),n,k,d), SYM). These parameters are stored in the memory space 5.

The secret key is: Sk(C, Ksym, I); it is, for example, stored in a memory area 6 protected according to means known to a person skilled in the art.

Second Step—Creation of the MAC Explained with FIG. 3

During the second step, the method will encode 20 or code the message or the data m by using the correcting code defined in the first step.

Firstly, let us consider the case of a systematic code (message+redundancy). The result of the coding is therefore the concatenation of m with a redundancy r, denoted m|r.

In transmission, the method comprises a step of protecting the confidentiality (alone) of the redundancy r by using the secret key Sk(C, Ksym, I). The protected redundancy is denoted rp=$SYM_{ksym}$(r), 21.

The protection of the redundancy in confidentiality is ensured by an encryption mechanism. To tolerate errors also in the redundancy, it is preferable to use an encryption mode that does not propagate the errors. Otherwise, the invention still works, but the errors tolerated are limited to the errors on the message. An encryption mode that does not propagate the errors is typically carried out by an xor with a pseudo-random generator, for example with a block algorithm in counter mode. The protected redundancy rp is called MACECC.

In the case of a transmission application where the message itself has to be protected in confidentiality, to exploit the invention, it will be necessary to use an encryption mode for the message m that does not propagate the errors.

The message m|rp (m concatenated with rp) is then transmitted in this example to the receiver or, more generally, to a data processing step.

Third Step Explained in Relation to FIG. 4

On receiving the message, 30, the method executes a first verification step Verify(messagetransmis,Sk) comprising the steps described below.

The data received messagetransmis are considered to be the concatenation of a message ma and of a redundancy ra (ma|ra). This verification is, for example, carried out as follows on the receiver. The mechanism for protecting the confidentiality of the redundancy is reversed using the secret key $SYM_{ksym}^{-1}$(ra), 30, ra retrieved, ra the encrypted redundancy received in the integrity verification step.

Let D1 be a decoding function which has as input any datum and which has as output the word of the code closest in terms of distance (which includes the redundancy) and as output a decoding successful or decoding unsuccessful information item 31. D1 is applied to the whole of the received message ma, concatenated with the inverse of the redundancy $SYM_{ksym}^{-1}$(ra):

$$D_1(ma|SYM_{ksym}^{-1}(ra)).$$

If the decoding is not possible (there is no single word of the code at a sufficiently small distance) 32, the response is NOK, the data are not considered to be integral.

Otherwise, if the decoding is possible 33:
If $d(h_{n-k}(D_1(ma|SYM_{ksym}^{-1}(ra))), ma) < I+1$, then the response is OK 34 with as effective useful message received $h_{n-k}(D_1(ma|SYM_{ksym}^{-1}(ra)))$; otherwise, the response is NOK 35, the data are considered to be non-integral. d( ) is the distance in terms of the number of elements of GF(p) that are different, and $h_{n-k}$ is the function which takes a character string as input and associates with it the n−k first characters of the string.

An alternative solution consists in applying the test not to the difference between the useful parts of the messages, but to the whole including the redundancy. The condition $d(h_{n-k}(D_1(ma|SYM_{ksym}^{-1}(ra))), ma) < I+1$ then becomes: $d(D_1(ma|SYM_{ksym}^{-1}(ra)), (ma|SYM_{ksym}^{-1}(ra)) < I+1$.

The steps described previously can also be applied to data other than the messages.

In the case where the code is not systematic, the method is modified as described below.

Any codes: an error-tolerant integrity scheme

Notations and Definitions

Let p be a prime number, GF(p) the body with p elements
Let $d_H$ be the hamming distance,
Let f be an application, with Im(f) its image,
Let n, d be two strictly positive integers. Let M be a set of vectors of length n defined over GF(p). If, for any pair of distinct elements of M, their hamming distance is greater than or equal to d and d is the greatest integer verifying this property, then the set of the vectors of M is a code denoted C(GF(p),n,M,d).

Let C be an element of the code C(GF(p),n,M,d). C has associated a defined injective encoder from GF(p)$^{n-k}$ to C and denoted $Enc_c$. Thus, the inverse function denoted $Enc_c^{-1}$ is defined from Im($Enc_c$) to GF(p)$^{n-k}$.

Let C be a C(GF(p),n,M=$p_k$,d) code (linear or not).

Let π be a permutation of GF(p)$^n$ and $p_{n,k}$ the projection of GF(p)$^n$ over GF(p)k such that $p_{n,k}(u_1, \ldots, u_n) = (u_1, \ldots, u_k)$. Take an encoder $Enc_c$ associated with the code $_c$, if there is $π_c$ and $p_{n,k}$ such that for m∈GF(p)$^{n-k}$, $p_{n,k}(_c(Enc_c(m)))=m$, then the encoder is said to be systematic. The code will be said to be systematic or k-systematic.

The Reed-Solomon codes are examples of codes for which there is a non-systematic encoder.

Let F(GF(p),n,M,d,k) be a family of error-correcting codes over GF(p) of length n, of cardinal M, of distance d and of redundancy of length k. If M=$p^k$, this family can contain linear and nonlinear codes.

Let C∈F(GF(p),n,M,d,k), m∈GF(p)$^{n-k}$, then we use $Enc_c$(m)∈GF(p)$^n$ to denote the code word of C associated with m. The operation of decoding a word m'∈GF(p)$^n$ will be denoted $Dec_c$(m') if this operation allows a single solution and then $Dec_c$(m')∈C.

x|y is the concatenation of the character string x with the string y.

Let f be a reversible function, its inverse is denoted f$^1$. $Sym_{ksym}$ is a symmetrical encryption algorithm acting on words of length n with the secret key ksym. The operation of encryption of the message m∈GF(p)$^n$ with this algorithm will be denoted $Sym_{ksym}$(m). The operation of decryption of a word m'∈GF(p)$^n$ with this algorithm will be denoted: $Sym^{-1}_{ksym}$(m').

Definition of an Error-Tolerant Integrity Scheme

Take a message m of length n−k. We will call the scheme defined by the following 3 methods (Gen, MAC$^3$, and Verify) an error-tolerant integrity scheme. This scheme makes it possible to construct a pattern of error-tolerant integrity.

Gen

Let F(GF(p),n,M,d,k) be a family of error-correcting codes over GF(p) of length n, of cardinal M, of distance d and of redundancy k. t is its correction capacity.

Let $0<I\leq t$, this integer I representing the number of errors accepted for the applications. A code C is drawn randomly from this code family. Let $Sym_{ksym}$ be an encryption algorithm. This encryption algorithm may be an encryption algorithm of block type or an algorithm of GPA (Gnu Privacy Assistant) type. Let therefore ksym be the secret key used for this algorithm. The public parameters are {F(GF (p),n,M,d,k), n, M, d, K), Sym, I}.

The secret key denoted $S_k$ is as follows: $S_k$=(C, ksym).

MAC

The code family chosen will need to have a good correction capacity and be effectively decodable in order for the solution to be effective.

The error-correcting code has a correction capacity denoted t, this correction capacity is greater than the tolerance desired for the transmission of the message.

Provided that the number of errors is less than t, the code makes it possible to retrieve the transmitted message. The method, more generally, is effective, secure, and can be parameterized.

The invention claimed is:

1. A method for testing a cryptographic integrity of data represented by m, in a system comprising at least one cryptographic integrity testing processor, an emitter comprising a first memory configured to store a key, public data, and a medium for transmission, and a receiver comprising a second memory for storing a secret key, said method comprising, in combination, at least the following steps executed by the at least one cryptographic integrity testing processor:
  a first step executed by the emitter during which a first secret key represented by Ksym is generated by executing the following sub-steps:
    storing in the first memory a family, represented by F(GF(p), n, M, k, d), of linear or nonlinear system error-correcting codes over a corpus of p number of elements represented by GF(p), wherein the family of linear or nonlinear error-correcting codes are characterized by the following parameters: a length represented by n, a cardinal represented by M, a dimension represented by k, and a distance represented by d,
    randomly drawing a correcting code represented by C, from the family, F, represented by a function F(GF (p), n, k, d), wherein the correcting code has a correction capacity represented by t, and defining the first secret key, Ksym;
  a second step executed at the emitter comprising the following sub-steps executed by the at least one cryptographic integrity testing processor:
    coding said data, m, by using the correcting code, C, selected from the family, F(GF(p), n, M, k, d), stored in the first step,
    computing, for a systematic code, a redundancy represented by r, and known as a message authentication code (MAC) to validate the cryptographic integrity of a message transmitted by the emitter and encrypting the redundancy using a second secret key Sk, which is a function of C, Ksym, and I, wherein the second secret key is stored in the second memory, wherein I is a non-zero integer less than the correction capacity, t, which represents the number of errors accepted in order to protect the redundancy, r, resulting in an encrypted redundancy represented by rp, wherein rp refers to a message authentication code with error correcting code (MACECC),
    wherein rp=$SYM_{ksym}$(r), wherein SYM is a symmetrical encryption block algorithm associated with the first secret key,
  transmitting, using the emitter over a telecommunications system, a transmitted message (m|rp) to the receiver, wherein (m|rp) represents a concatenation of m and rp to form the transmitted message;
  a third step executed by the receiver comprising receiving a received message (ma|ra) over the telecommunications system, wherein (ma|ra) representing the concatenation of the received message data ma and a received encrypted redundancy ra, and further comprising the following sub-steps executed by the at least one cryptographic integrity testing processor:
  using a systematic code represented by the received message (ma|ra), as an input data for an integrity checking function, wherein the integrity checking function comprises:
  reversing a redundancy confidentiality protection mechanism using an inverse of the symmetrical encryption algorithm $SYM_{ksym}^{-1}$(ra) associated with the first secret key,
  applying a decoding function represented by $D_1$ associated with the chosen correcting code C wherein the decoding function takes as an input any received message data ma and produces as an output a word having a corrected code that is closest in terms of a Hamming distance, and wherein the decoding function $D_1$ is applied to a concatenation of the received message data with the inverse of the symmetrical encryption algorithm associated with the first secret key $D_1$(ma|$SYM_{ksym}^{-1}$(ra)),
    determining whether the output, the word having the corrected code, of the decoding function of the receiver is valid, wherein the output of the decoding function is valid when the output of the decoding function equals mr, wherein mr=($D_1$(ma|$SYM_{ksym}^{-1}$(ra)), ma), indicating that decoding is possible, and wherein the output of the decoding function is invalid when the word having the corrected code is determined to be not valid, indicating that decoding is not possible, the data of the received message are determined to be non-integral, indicating a spoofed message, and the data of the received message are not accepted by the receiver,
  when the word having the corrected code is determined to be valid, indicating that decoding is possible, further determining, by the receiver, whether d($h_{n-k}$($D_1$(ma|$SYM_{ksym}^{-1}$(ra)), ma)<I+1, wherein the distance function d( ) is a distance in terms of the number of elements of GF(p) that are different, and $h_{n-k}$ is the function which takes a character string as input and associates with the character string the first n−k characters of the character string,
  if d($h_{n-k}$($D_1$(ma|$SYM_{ksym}^{-1}$(ra)), ma)<I+1 is satisfied, the data of the received message are determined to be integral and a response of the receiver is represented by a valid (OK) message, indicating that an effective useful message was received, the data of the received message are decoded, the data of the received message are accepted, and the data of the received message are retrieved by the at least one cryptographic integrity testing processor,
  otherwise, if d($h_{n-k}$($D_1$(ma|$SYM_{ksym}^{-1}$(ra)), ma)<I+1, is not satisfied, the data of the received message are determined to be non-integral, indicating a spoofed message, wherein the decoded data of the received message are rejected by the receiver.

2. The method as claimed in claim 1, wherein, in the case of a systematic code, the method comprises an encryption step encrypting all of the effective useful message, encrypting the redundancy r in transmission, and a decryption step decrypting said received message.

3. The method as claimed in claim 1, wherein the processed data are messages used in transmission systems.

4. The method as claimed in claim 1, wherein the redundancy r is protected using a block encryption or an XOR using a pseudo-random generator.

5. A system for testing a cryptographic integrity of data represented by m comprising at least the following elements:
an emitter transmitting a transmitted message over a telecommunications system, said emitter comprising a memory for parameters including a key, public data, and a transmission medium,
a receiver configured to receive a received message over the telecommunications system, the receiver comprising a first storage device for at least the same parameters as in transmission, a second storage device for storing a secret key, and
at least one cryptographic integrity testing processor configured to execute the following steps:
a first step executed by the emitter during which a first secret key represented by Ksym is generated by executing the following sub-steps:
storing in the memory a family, represented by F(GF(p), n, M, k, d), of linear or nonlinear system error-correcting codes over a corpus of p number of elements represented by GF(p), wherein the family of linear or nonlinear error-correcting codes are characterized by the following parameters: a length represented by n, a cardinal represented by M, a dimension represented by k, and a distance represented by d,
randomly drawing a correcting code represented by C, from the family, F, represented by a function F(GF(p), n, k, d), has a correction capacity represented by t, and defining the first secret key, Ksym;
a second step executed at the emitter comprising the following sub-steps:
coding said data, m, by using the correcting code, C, selected from the family, F(GF(p), n, M, k, d), stored in the first step,
computing, for a systematic code, a redundancy represented by r, and known as a message authentication code (MAC) to validate the cryptographic integrity of the transmitted message transmitted by the emitter and encrypting the redundancy using a second secret key Sk, which is a function of C, Ksym, and I, wherein the second secret key is stored in the second storage device, wherein I is a non-zero integer less than the correction capacity, t, which represents the number of errors accepted in order to protect the redundancy, r, resulting in an encrypted redundancy represented by rp, wherein rp refers to a message authentication code with error correcting code (MACECC), wherein $rp=SYM_{ksym}(r)$, wherein SYM is a symmetrical encryption block algorithm associated with the first secret key,
transmitting, using the emitter over a telecommunications system, a transmitted message (m|rp), wherein (m|rp) represents a concatenation of m and rp to form the transmitted message;
a third step executed by the receiver comprising receiving a received message (ma|ra) over the telecommunications system, wherein (ma/ra) representing the concatenation of the received message data ma and a received encrypted redundancy ra, and further comprising the following sub-steps executed by the at least one cryptographic integrity testing processor:
using a systematic code represented by the received message (ma|ra), as an input data for an integrity checking function, wherein the integrity checking function comprises:
reversing a reverse the redundancy confidentiality protection mechanism using an inverse of the symmetrical encryption algorithm $SYM_{ksym}^{-1}(ra)$ associated with the first secret key,
applying a decoding function represented by $D_1$ associated with the chosen correcting code C, wherein the decoding function takes as an input any received message data ma and produces as an output a word having a corrected code that is closest in terms of a Hamming distance, and wherein the decoding function $D_1$ is a lied to a concatenation of the received message data with the inverse of the symmetrical encryption algorithm associated with the first secret key $D_1(ma|SYM_{ksym}^{-1}(ra))$,
determining whether the output, the word having the corrected code, of the decoding function of the receiver, is valid, wherein the output of the decoding function is valid when the output of the decoding function equals mr, wherein mr=$(D_1(ma|SYM_{ksym}^{-1}(ra)), ma)$, indicating that decoding is possible, and
wherein the output of the decoding function is invalid when the word having the corrected code is determined to be not valid, indicating that decoding is not possible, the data of the received message are determined to be non-integral, indicating a spoofed message, and the data of the received message are not accepted by the receiver,
when the word having the corrected code is determined to be valid, indicating that decoding is possible, further determining, by the receiver, whether $d(h_{n-k}(D_1(ma|SYM_{ksym}^{-1}(ra)), ma) < I+1$, wherein the distance function d( ) is a distance in terms of the number of elements of GF(p) that are different, and $h_{n-k}$ is the function which takes a character string as input and associates with the character string the first n−k characters of the character string,
if $d(h_{n-k}(D_1(ma|SYM_{ksym}^{-1}(ra)), ma) < I+1$ is satisfied, the data of the received message are determined to be integral and a response of the receiver is represented by a valid (OK) message, indicating that an effective useful message was received, the data of the received message are decoded, the data of the received message are accepted by the receiver, and the data of the received message are retrieved by the at least one cryptographic integrity testing processor,
otherwise, if $d(h_{n-k}(D_1(ma|SYM_{ksym}^{-1}(ra)), ma) < I+1$ is not satisfied, the data of the received message are determined to be non-integral, indicating a spoofed message, wherein the decoded data of the received message are rejected by the receiver.

* * * * *